(12) United States Patent
Brown et al.

(10) Patent No.: US 6,417,477 B1
(45) Date of Patent: Jul. 9, 2002

(54) METHOD AND APPARATUS FOR ELECTROSPARK ALLOYING

(75) Inventors: Lawrence E. Brown, Indianapolis; Stephen N. Hammond, Brownsburg; Mark C. Nordin, Indianapolis, all of IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/587,016

(22) Filed: Jun. 5, 2000

Related U.S. Application Data
(60) Provisional application No. 60/138,190, filed on Jun. 8, 1999.

(51) Int. Cl.[7] .................................................. B23K 9/04
(52) U.S. Cl. .............................. 219/76.13; 219/137.62
(58) Field of Search ........................ 219/76.13, 137.62

(56) References Cited

U.S. PATENT DOCUMENTS

| | | |
|---|---|---|
| 2,777,928 A | 1/1957 | Bernard |
| 3,061,712 A | 10/1962 | Inoue |
| 3,098,150 A | 7/1963 | Inoue |
| 3,663,788 A | 5/1972 | Inoue |
| 3,741,426 A | 6/1973 | Inoue |
| 3,832,514 A | 8/1974 | Antonov |
| 3,924,096 A | 12/1975 | Yanakieva et al. |
| 4,205,211 A | 5/1980 | Serlin et al. |
| 4,226,697 A | 10/1980 | Antonov et al. |
| 4,292,494 A | 9/1981 | Trishevsky et al. |
| 4,346,281 A | 8/1982 | Inoue |
| 4,405,851 A | 9/1983 | Sheldon |
| 4,551,603 A | 11/1985 | Rocklin |
| 4,728,488 A | 3/1988 | Gillett et al. |
| 4,764,854 A | 8/1988 | Ady |
| 5,071,059 A | 12/1991 | Heitman et al. |
| 5,102,031 A | 4/1992 | Heitman et al. |
| 5,347,098 A | 9/1994 | Murakami et al. |
| 5,378,867 A | 1/1995 | Niinuma |
| 5,448,035 A | 9/1995 | Thutt et al. |
| 5,643,479 A | 7/1997 | Lloyd et al. |
| 5,829,664 A | 11/1998 | Spinella et al. |
| 5,980,681 A | 11/1999 | Siemroth et al. |
| 6,020,568 A | 2/2000 | Joseph |

*Primary Examiner*—Clifford C. Shaw
(74) *Attorney, Agent, or Firm*—Woodard, Emhardt, Naughton Moriarty & McNett

(57) ABSTRACT

An electrospark alloying apparatus includes a main body member, a collet coupled to the main body member, and a heat sink adjacent the collet. The collet is adapted to receive and hold a consumable electrode. The apparatus can also include a drive for rotating the electrode. Further, the apparatus can include an inert gas supply and a discharge opening in the main body member for facilitating lamellar gas flow of insert gas from the inert gas supply around the electrode. A method of electrospark alloying includes electrospark alloying a workpiece with a consumable electrode and cooling the electrode during the electrospark welding.

26 Claims, 18 Drawing Sheets

ESA Applied Ren'e 142 on CMSX-3

Fig. 18

ESA Mass Deposition vs. Rotation Speed

METHOD AND APPARATUS FOR ELECTROSPARK ALLOYING

REFERENCE TO RELATED APPLICATIONS

This application claims the benefit of U.S. Provisional Application Ser. No. 60/138,190, filed Jun. 8, 1999, which is herein incorporated by reference.

BACKGROUND OF THE INVENTION

The present invention relates generally to a method and apparatus for electrospark alloying (ESA). More particularly, in one embodiment of the present invention, the electrospark alloying defines a micro-welding process for depositing a portion of the rotating electrode onto the work piece to form a fully dense metallurgical bond therebetween. Although the invention was developed for the repair of metallic gas turbine engine components, certain applications may be outside of this field.

Electrospark alloying refers to a micro-welding process that uses a short duration electrical pulse to melt and deposit a portion of a consumable metallic electrode onto a metallic base material. The deposited material alloys with the base material to form a metallurgical bond. The short duration of the electrical pulse allows for the extremely rapid solidification of the deposited material and results in a fine-grained homogeneous weld deposit.

In an electrospark alloying process, the electrode and the work piece are conductive and form the terminal points of a direct current power source. When a surge of energy is applied to the electrode, a spark is generated between the electrode and the work piece. A portion of the metal electrode is melted due to the high temperature of the spark, which is then transferred from the electrode to the substrate surface by short circuit transfer.

The phenomena of transferring a metallic electrode material a base metal by short duration electric arcs has been carried out in a variety of ways over the years. The following references are believed to be representative of such earlier manufacturing processes.

| Patent No. | Patentee | Issue Date |
|---|---|---|
| 3,097,291 | Adcock | 07/1963 |
| 3,098,150 | Inoue | 07/1963 |
| 3,277,266 | Blaszkowski | 10/1966 |
| 4,405,851 | Sheldon | 09/1983 |
| 5,071,059 | Heitman | 12/1991 |
| 5,448,035 | Thutt | 09/1995 |

Even with a variety of earlier processes, there remains a need for an electrospark alloying process and an apparatus for electrospark alloying. The present invention satisfies this need in a novel and unobvious way.

SUMMARY OF THE INVENTION

One form of the present invention contemplates a welding apparatus, comprising: a main body member; a collet coupled to the main body member and adapted for receiving and holding a consumable electrode; and a heat sink adjacent the collet for cooling the electrode received in the collet.

Another form of the present invention contemplates a an electrospark alloying apparatus, comprising: a supply of inert gas; a main body member; a chuck coupled to the main body member and adapted for receiving and holding a consumable electrode, a portion of the electrode extending from the main body member; a drive coupled to the chuck for rotating the chuck; and a discharge opening in the main body member, the discharge opening is in fluid communication with the supply of inert gas, wherein the discharge opening facilitates a lamellar gas flow adapted for shielding the portion of the electrode.

Yet another form of the present invention contemplates a method for welding high Gamma prime type materials without preheating the base material.

One aspect of the present invention contemplates a process for depositing thick weld deposits with an electrospark alloying system.

One object of the present invention is to provide a unique method and apparatus for electrospark alloying.

Related objects and advantages of the present invention will be apparent from the following description.

BRIEF DESCRIPTION OF THE DRAWINGS

FIG. 18 is a graph of mass deposition compared with rotation speed.

DESCRIPTION OF THE PREFERRED EMBODIMENT

Figure 1:
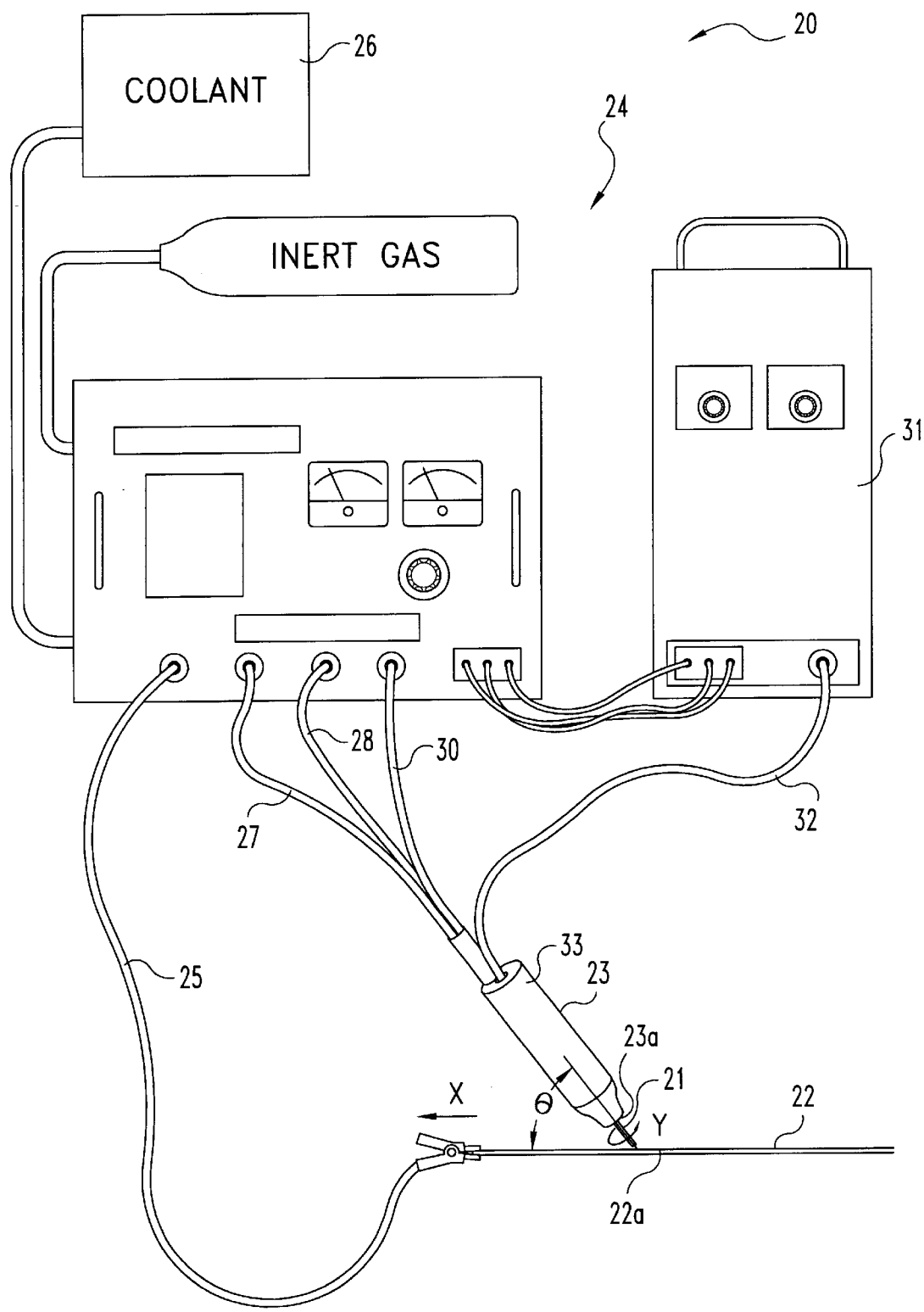
FIG. 1 is an illustrative view of one embodiment of the present invention comprising a system for electrospark alloying.

For the purposes of promoting an understanding of the principals of the invention, reference will now be made to the embodiment illustrated in the drawings and specific language will be used to describe the same. It will, nevertheless, be understood that no limitation of the scope of the invention is thereby intended, and such alterations and further modifications of the illustrated device, and such further applications of the principals of the invention as illustrated therein being contemplated as would normally occur to one skilled in the art to which the invention relates.

Referring to FIG. 1, there is illustrated an electrospark alloying system 20 for transferring material from the electrode 21 to the substrate/base material 22. The electrospark alloying process is applicable to repairing almost any metallic engine component, and typical components suitable for electrospark alloying repair include blades, vanes, vane supports, diffusers, combustor cases and spacers. In a preferred form the process deposits material upon superalloy components with a substantially negligible affect on the base material. Further, general technological information related to electrospark alloying is believed known to one of ordinary skill in the art and can be found in patents such as U.S. Pat. No. 4,405,851 to Sheldon entitled "Apparatus and for Transfer of Metallic Materials by Electric Discharge", U.S. Pat. No. 5,071,059 to Heitman et al. entitled "Method for Joining Single Crystal Turbine Blade Halves" and U.S. Pat. No. 5,448,035 entitled "Method and Apparatus for Pulse Fusion Surfacing", which are incorporated herein by reference. Hereinafter, the electrospark alloying process will be referred to as welding, unless stated specifically to the contrary.

The electrode 21 and the base material 22 are conductive so that when a surge of energy is applied to the electrode a spark is generated between the two components. The spark functions to melt a portion of the electrode 21 and transfer a weld deposit to the surface of the substrate 22. The consumable electrode 21 is held by an electrode holder 23 that is operatively coupled to a control unit 24. In one embodiment the control unit 24 includes: a power supply which provides the current needed for the welding; a coolant source to cool the electrode; an inert gas source for shielding the electrospark alloying arc and the substrate/work piece to prevent oxidation of the weld deposit; and, an electric motor for rotating the electrode 21. However, it is understood that the present invention is not intended to be limited to the particular control unit described in FIG. 1, and other control units having some or all of the functions disaggregated or removed are contemplated herein.

The substrate 22 is connected to a ground cable 25 and the electrode holder 23 is connected to: a coolant source 26 by a coolant line 27; a power source (not illustrated) by a power cable 28; an inert gas supply 29 by a gas shielding line 30; and a motor 31 by a rotatable flexible shaft 32. In one embodiment each of the coolant source 26, the power source, and the inert gas supply 29 and the motor 31 are variable by changing settings on the control unit 24. The present invention is not limited to the control unit 24 and it is believed that the design of a control unit for controlling the electrospark alloying system is within the scope of a person of ordinary skill in the art. In one alternate embodiment the motor and drive mechanism to drive the electrode 21 in a rotational fashion is located within the body 33 of the electrode holder 23. Thus, the rotatable flexible shaft is removed and the motor and drive mechanism are joined with the electrode holder.

The electrode 21 is rotated in either a clockwise or counter clockwise direction in order to create a continuous make and brake with the system ground. Thereby providing intermittent contact with a surface 22a of the work piece 22 to cause repetitive electrical discharges. In a preferred form of the present invention the electrode is rotated at speeds between about 500 revolutions per minute (hereinafter RPM) and about 1500 RPM, and more preferably is rotated at about 1200 RPM. In one embodiment the electrode holder 23 and the electrode 21 are moved during the welding process against the direction of rotation of the electrode. With reference to FIG. 1, the electrode is rotating in the direction of arrow "Y" and is being advanced in the direction of arrow "X". The advancement in the direction of arrow "X" defines a stroke length, and in one embodiment of a system manually controlled by a human operator the stroke length is maintained within a range of about 0.25 inches and about 0.75 inches. However, the present invention is not limited to use in these stroke lengths. However, it is understood herein that the direction and speed of rotation of the electrode and the movement of the electrode holder relative to the direction of rotation of the electrode are variable to meet the parameters of a specific work piece.

The welding process preferably utilizes an inert gas shielding to prevent oxidation of the weld deposit. The selection of an inert gas appropriate for shielding is believed within the knowledge of a person of ordinary skill in the art. In one embodiment the inert gas is defined by argon, helium, or carbon dioxide and/or mixtures thereof. More preferably, the inert gas shielding is an argon gas shield. In one embodiment the inert gas shield is delivered through the electrode holder 23 and out the end 23a to shield the electrode 21 and the substrate 22 as the weld deposit is being laid down. In one embodiment the flow of inert gas is at a rate of about 15 to about 30 cubic feet per hour (CFH) with a line pressure of about 500 pounds per square inch (PSI). However, the present invention is not limited to these flow parameters and other flow parameters are contemplated herein.

Figure 2A:
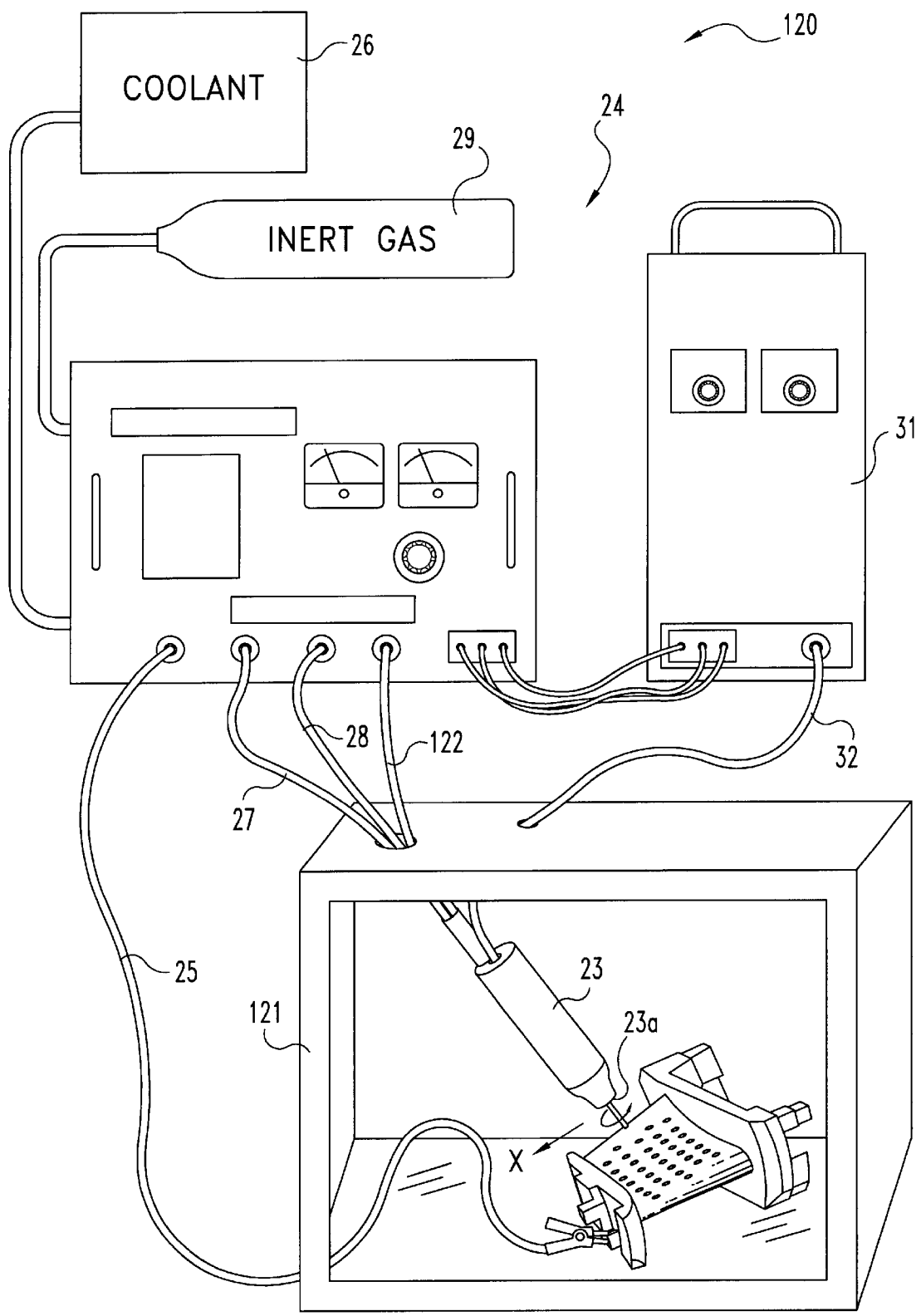
FIG. 2a is an illustrative view of another embodiment of the present invention comprising a system for electrospark alloying within a controlled atmosphere chamber.

With reference to FIG. 2a, there is illustrated an another embodiment of the electrospark alloying system 120 of the present invention. The electrospark alloying system 120 is substantially similar to the electrospark alloying system 20 and like feature numbers will be utilized to represent like features. A primary distinction between the systems is that the system 120 performs the welding operation within a chamber 121 having an inert atmosphere. More preferably, the inert atmosphere is defined by argon gas. The inert gas supply 29 is connected to the inside of the chamber 121 by a supply line 122. The electrode holder 23 has been shown unmodified and the supply of inert gas has been directly routed to the inside volume of the chamber 121 so as to eliminate the need for the inert gas shielding being discharged from the end 23a of the electrode holder 23. However, in an alternate embodiment an electrode holder is constructed to eliminate the inert gas delivery system through the end 23a.

Figure 2B:
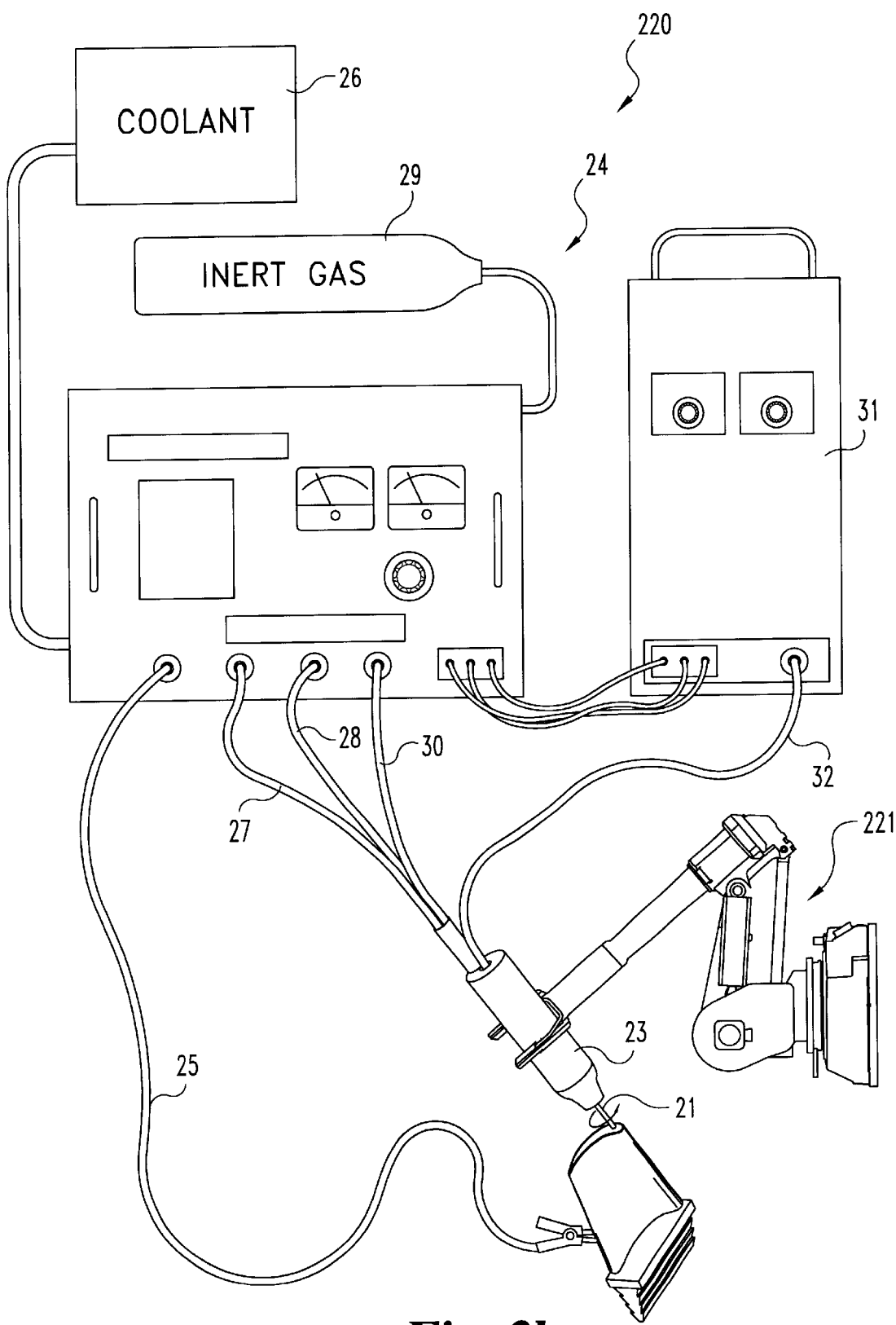
FIG. 2b is an illustrative view of another embodiment of the present invention comprising an automated system for electrospark alloying.

With reference to FIG. 2b, there is illustrated another embodiment of an electrospark alloying system 220 of the present invention. The electrospark alloying system 220 is substantially similar to the systems 20 and 120 and has a primary distinction in that the electrode holder 23 is coupled to a mechanized system 221 for moving the electrode holder 23. The mechanized system 221 is preferably computer controlled to automatically control the movement of the electrode holder 23. The automatically controlled electrospark alloying system can accommodate much longer stroke lengths than a typical human operator can utilize. The welding process can occur in an environmentally controlled chamber or can utilize the delivery of the inert gas through the electrode holder to shield the substrate and the arc generated to make the weld deposit.

Figure 3:
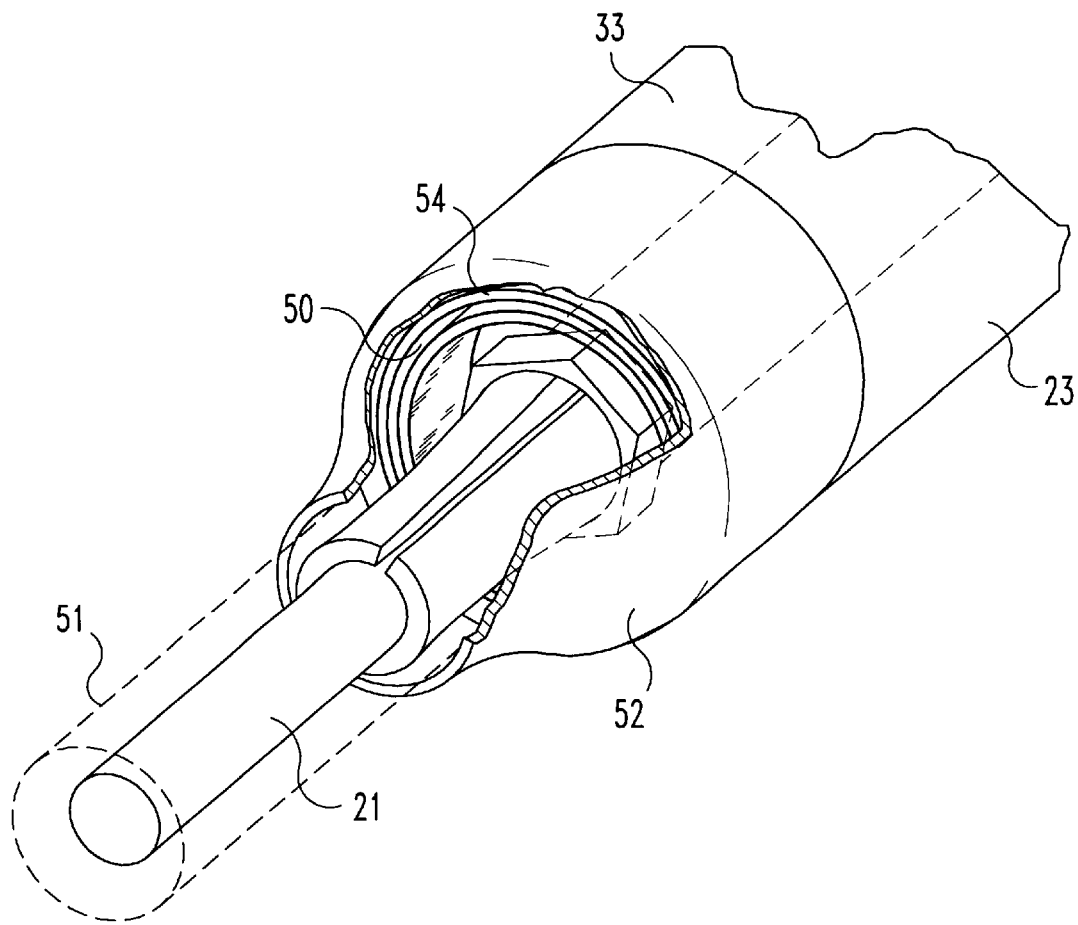
FIG. 3 is a partial fragmented view of the electrode holder comprising a portion of the FIG. 1 system.

With reference to FIG. 3, there is illustrated an enlarged fragment portion of the electrode holder 23 having an inert gas delivery system. The inert gas delivery system is in fluid communication with the inert gas shielding line 30. The inert gas passes along the body 33 of the electrode holder 23 and out through a discharge opening 50 to the area where the localized welding is occurring. In one embodiment the supply of inert gas flows through a manifold system within the body 33 of the electrode holder 23 and is discharged through a discharge opening 50 to form a lamellar (single direction-non turbulent) gas flow that shields the electrode 21, the arc that melts a portion of the electrode, and the substrate where the weld is being deposited. In FIG. 3, a mesh cage has been removed to aid the reader in understanding the design of electrode holder. The mesh cage (not illustrated) extends from surface 54 inward and substantially follows the curvature of the inner surface of the nozzle cup 52. In one embodiment the inert gas forms a substantially uniform gaseous flow volume 51 around the electrode 21. One form of the discharge opening 50 is an annular opening extending around the electrode. The discharge opening 50 discharging the inert gas stream into a passageway formed within a nozzle cup 52 that is attached to the body 33 of the electrode holder. One form of the nozzle cup is a Thermal Dynamics Gas Cup Adapter having a part number 8-4040. However, the present invention is not limited to use of the Thermal Dynamics Gas Cup.

Figure 4:
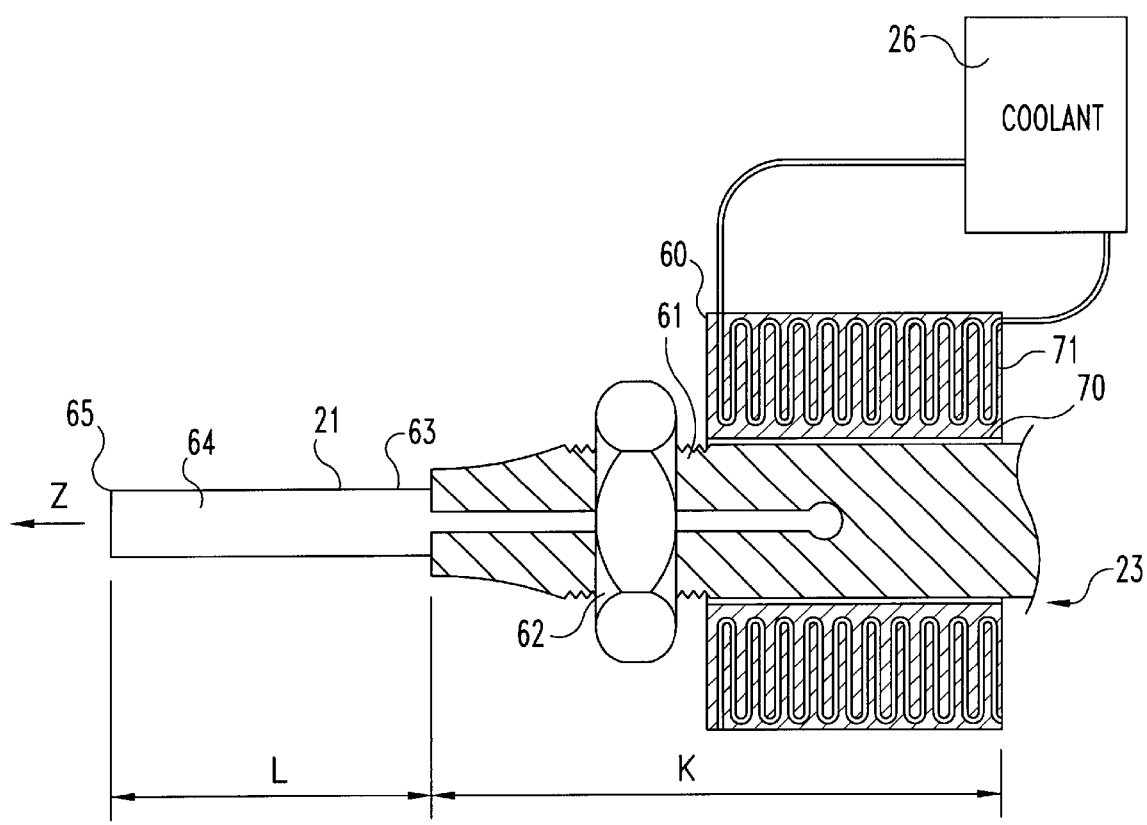
FIG. 4 is an illustrative sectional view of one embodiment of a cooled electrode holder of the present invention.

With reference to FIG. 4, there is illustrated a sectional view of a portion of the electrode holder 23. The electrode 21 is held within a collet 61 and has an electrode stick-out portion 64 extending from the collet 61 to the tip 65 of the electrode. In one form the electrode stick-out portion 64 has a length defined by "L", and preferably the length "L" is within a range of about 0.5 inches and about 1.0 inches. The collet 61 has a tightening means 62 for securely locking the electrode within the collet. In one embodiment the collet is designed and constructed to hold the electrode during rotation so that its centerline "Z" remains concentric during rotation to within about 0.005 inches. Further, the inner surface of the collet 61 maintains continuous contact with an outer surface 63 of the electrode along a length "K". In a preferred form of the present invention the length "K" is in the range of about 0.5 inches to about 2.0 inches and more preferably is at least about 1.0 inches. The collet is preferably formed of a copper alloy and transfers the power from the power cable 28 to the electrode 21.

In a preferred embodiment the electrode 21 is cooled during the welding process. It has been discovered that cooling the electrode 21 improves the deposition rate. In one form a heat transfer system 60 withdraws energy from the collet 61. More specifically, the heat transfer system 60 is an actively cooled system that is positioned along and in thermal conductivity with the collet 61. In one embodiment the heat transfer system includes a main body member 70 formed of a metallic material with a cooling passageway 71 formed therein. The main body member 70 is placed in an abutting relation with the collet 61 to facilitate conductive heat transfer to cool the electrode. The cooling passageway is in fluid communication with a coolant within the coolant source 26. Preferably, the coolant defines a cooling media such as water/glycol having a temperature within the range of about thirty to about forty degrees Fahrenheit. The prior coolant temperature is selected for use in an environment where the ambient temperature is about 78 degrees Fahrenheit, however other coolant temperatures and room temperatures are contemplated herein. It should be understood herein that the present invention is not intended to be limited to the specific embodiment set forth to cool the electrode, and other techniques for cooling the electrode are contemplated herein.

Figure 5:
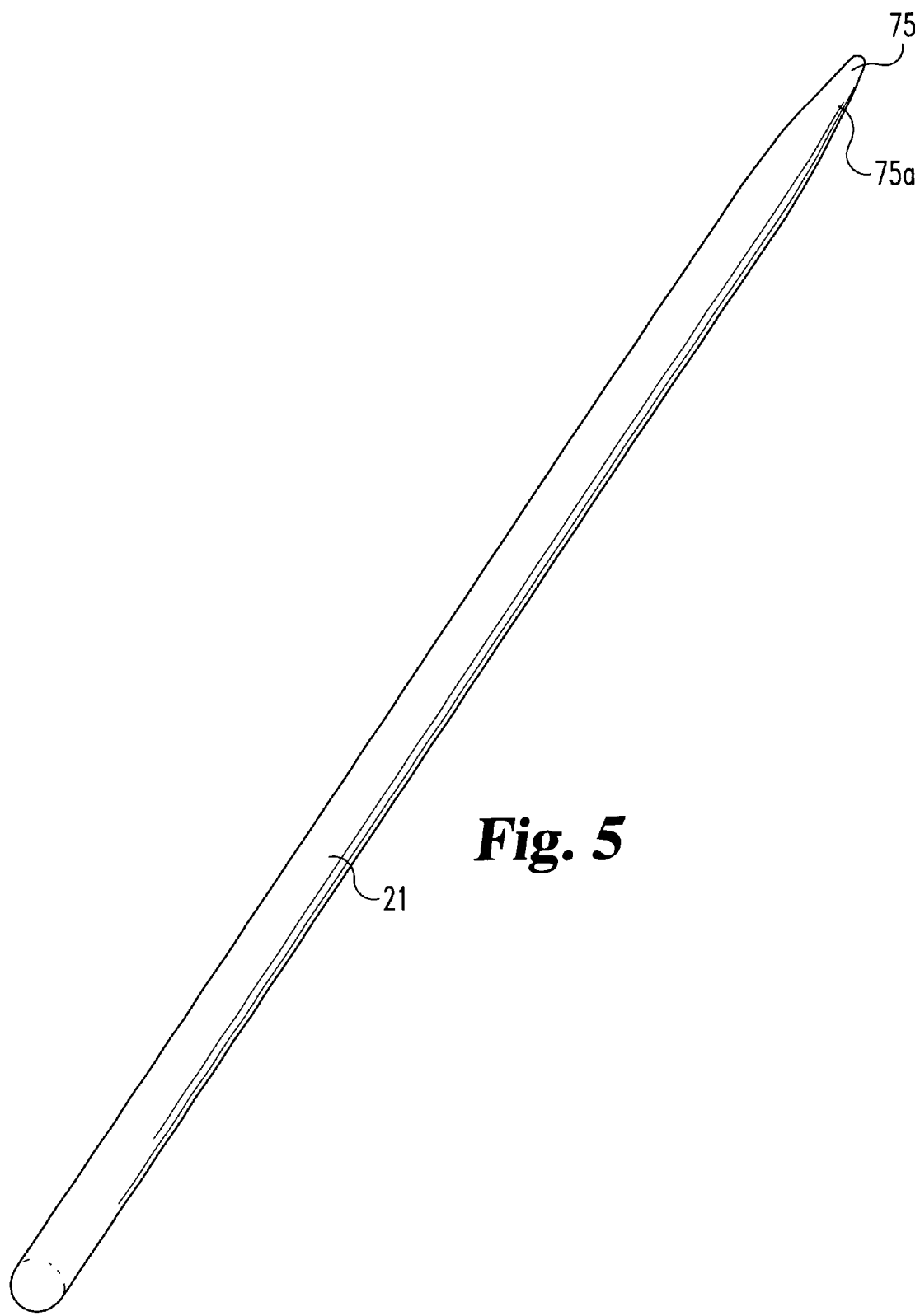
FIG. 5 is a perspective view of one embodiment of an electrode of the present invention.

With reference to FIG. 5, there is illustrated one embodiment of the electrode 21 that has a substantially cylindrical shape with a conical tip 75. However, other geometric shapes are contemplated herein including, but not limited to, rounded. In one form of the present invention the electrode has a diameter of about 0.125 inches, a tip profile of about 0.062, and a length of about three inches, however, other diameters and lengths are contemplated herein. In one alternate embodiment, the electrode has a substantial length and is automatically progressively advanced so as to minimize the time for changing electrodes. The electrodes are formed of a metallic material, such as an alloy or a superalloy. The electrode may be formed of the same or different material from the work piece and in one form the electrode 21 have been final ground to shape. Electrodes that have been deposited by electrospark alloying include superalloy materials such as IN-718, IN-738, Mar-M-246, René' 142, Waspaloy, CMSX-3 and Haynes 188. Other materials that have been deposited include stainless 347, Coast Metal and braze alloy AMS 4777. The pent invention is not intended to be limited to these materials and other materials are contemplated herein. The welding process can be utilized to form a weld deposit on a component/work piece having a microstructure that is commonly categorized as equiaxed, directionally solidified or single crystal.

The electrode 21 is oriented at an angle θ to the surface 22a of the work piece 22 during the normal welding process. Preferably, the electrode is oriented at a 45-degree angle to the surface 22a at the start of the deposition process and the heel portion 75a of the electrode is used to coat the substrate. During deposition the 0.062 inch radius is maintained by adjusting the work angle θ through a range of about 30 degrees to 90 degrees. It is preferred that when the electrode forms a point the electrode point is removed.

Figure 6:
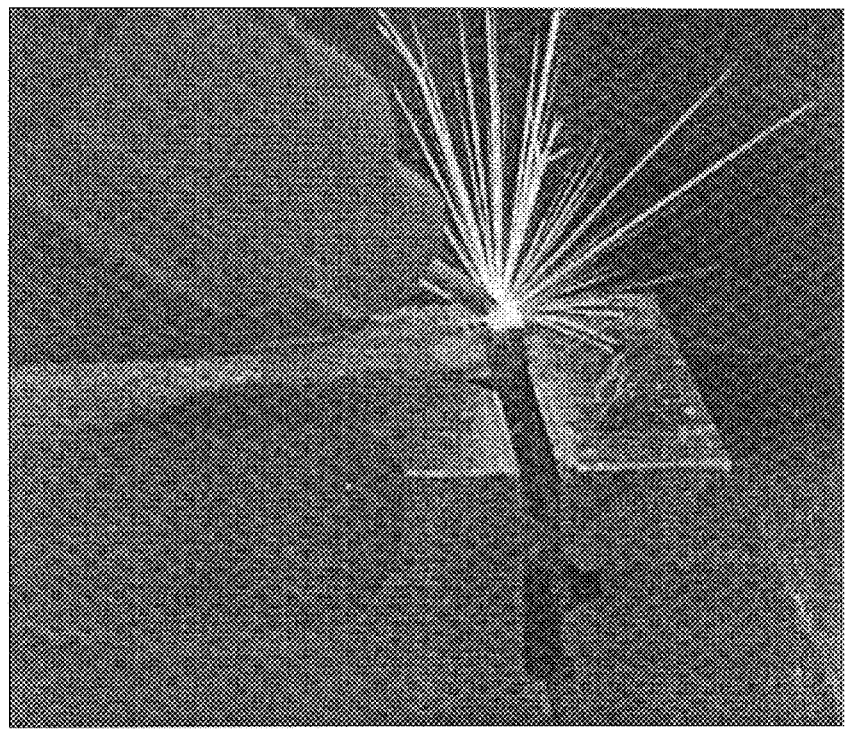
FIG. 6 is an image of an electrospark alloying process utilizing a sharpened electrode.
Figure 7:
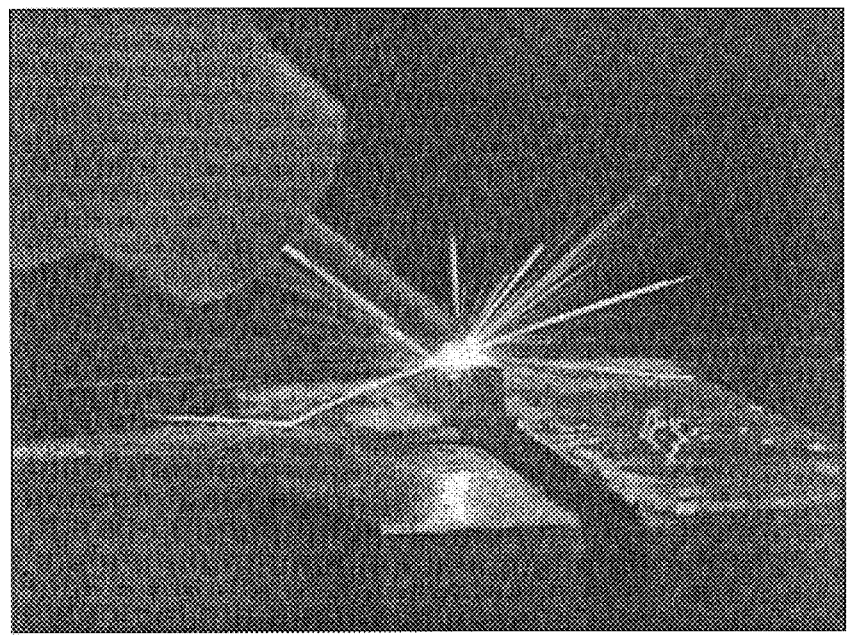
FIG. 7 is an image of an electrospark alloying process utilizing a rounded electrode.
Figure 8:
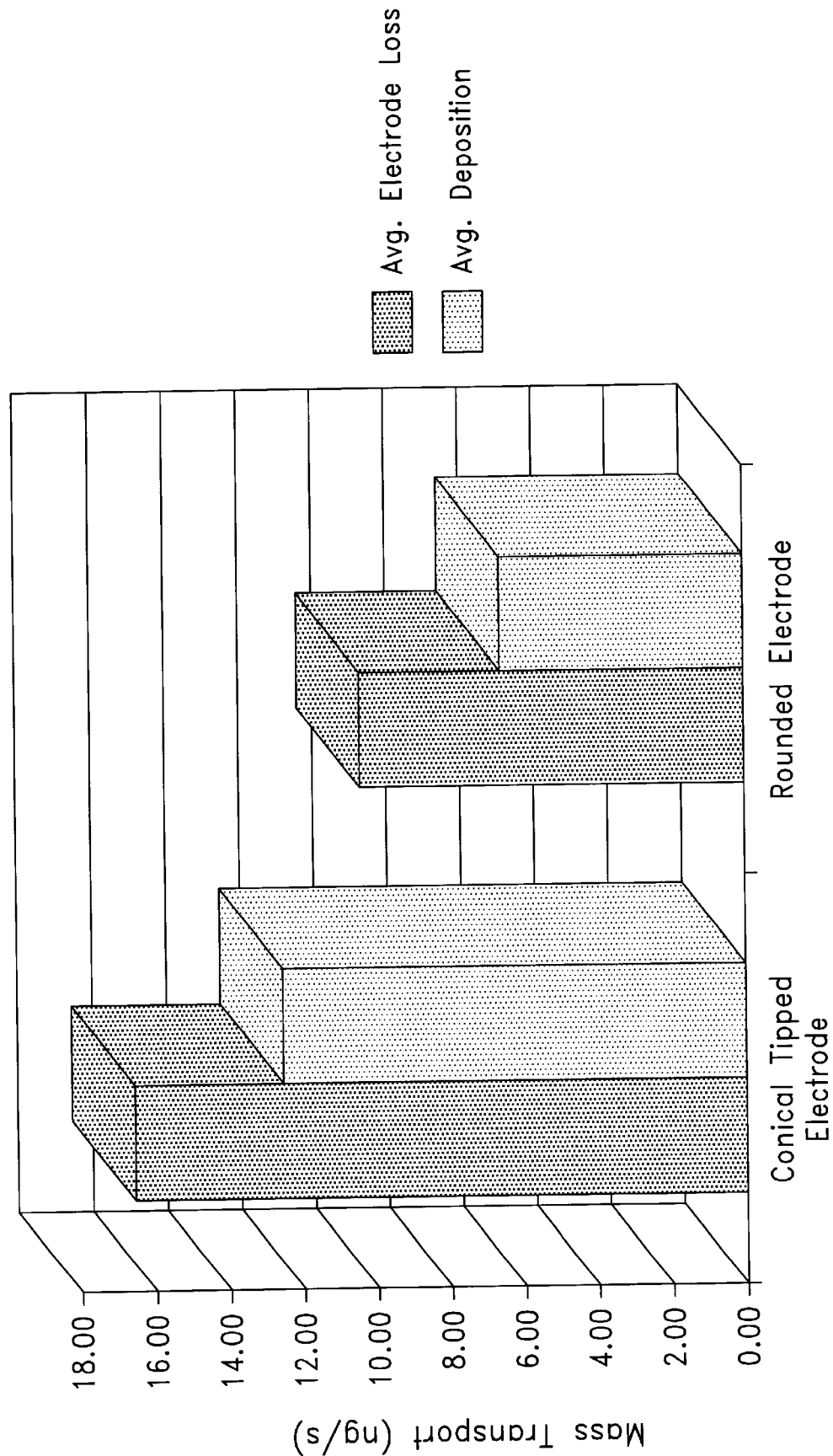
FIG. 8 is a graph showing mass deposition and electrode loss for different types of electrodes.

With reference to FIGS. 6 and 7, there are illustrated photographs demonstrating the electrospark alloying spark phenomena with a conical tip and a rounded tip. The conical tipped electrode of FIG. 6, was found to produce more intense sparks than the rounded tip electrode in FIG. 7. The average mass deposition and electrode loss data for each type of electrode is shown in FIG. 8. As shown in FIG. 8, the deposition rate was found to be higher for the conical tipped electrode than the rounded tipped electrode. The mass deposition efficiency (mass gained by the substrate divided by mass lost by the electrode) was also higher for the conical tipped (sharpened) electrodes.

Figure 9:
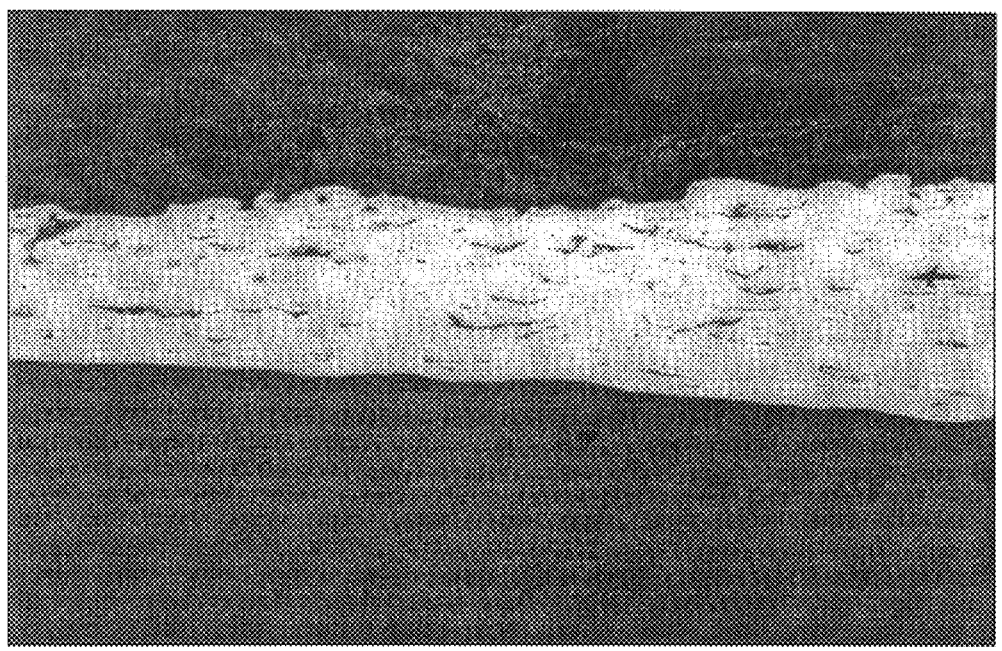
FIG. 9 is a cross sectional view of the microstructure of a sample that was prepared by an electrospark alloying process without a controlled environment.
Figure 10:
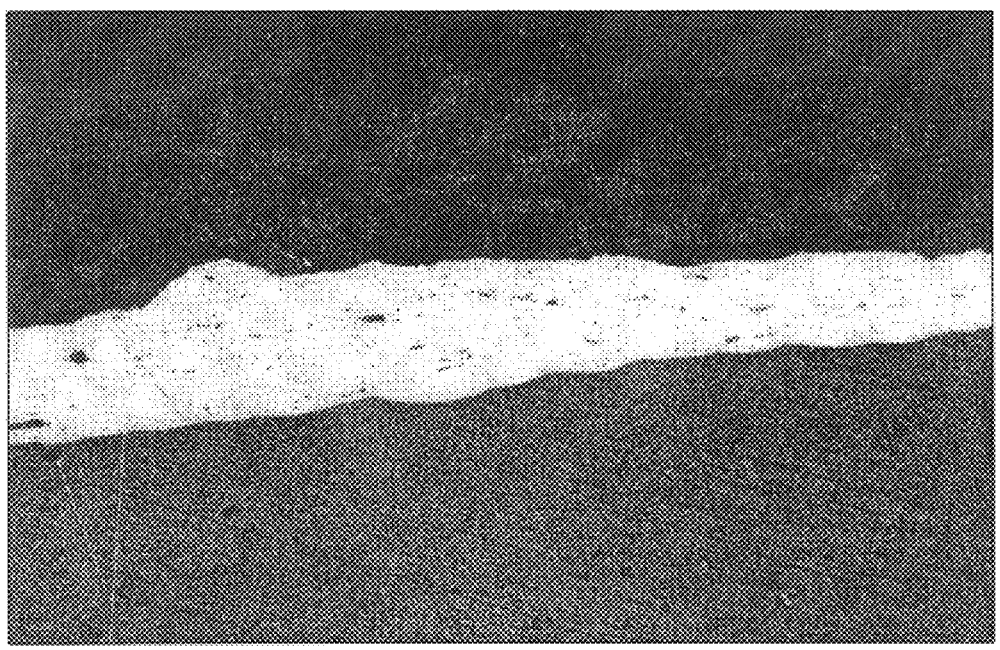
FIG. 10 is a cross sectional view of the microstructure of a sample that was prepared by an electrospark alloying process utilizing an argon gas shield stream.
Figure 11:
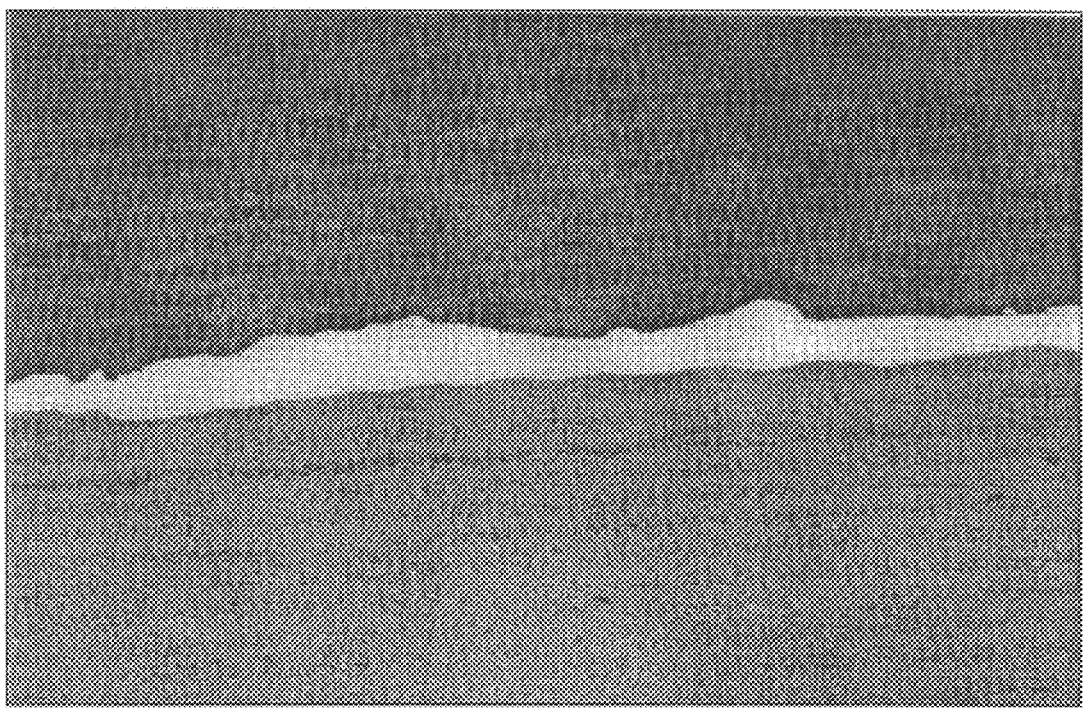
FIG. 11 is a cross sectional view of the microstructure of a sample that was prepared by an electrospark alloying process within a controlled atmosphere chamber.

With reference to FIGS. 9–11, there are illustrated samples that were prepared and evaluated for microstructure integrity based upon the amount of voids and oxide inclusions in the weld deposits. The sample in FIG. 9 was prepared without an inert gas shield and contains more voids and oxides than the samples of FIGS. 10 and 11. The sample of FIG. 10 was prepared in a shield stream of argon gas, and the sample of FIG. 11 was prepared in an argon atmosphere chamber.

Figure 12:
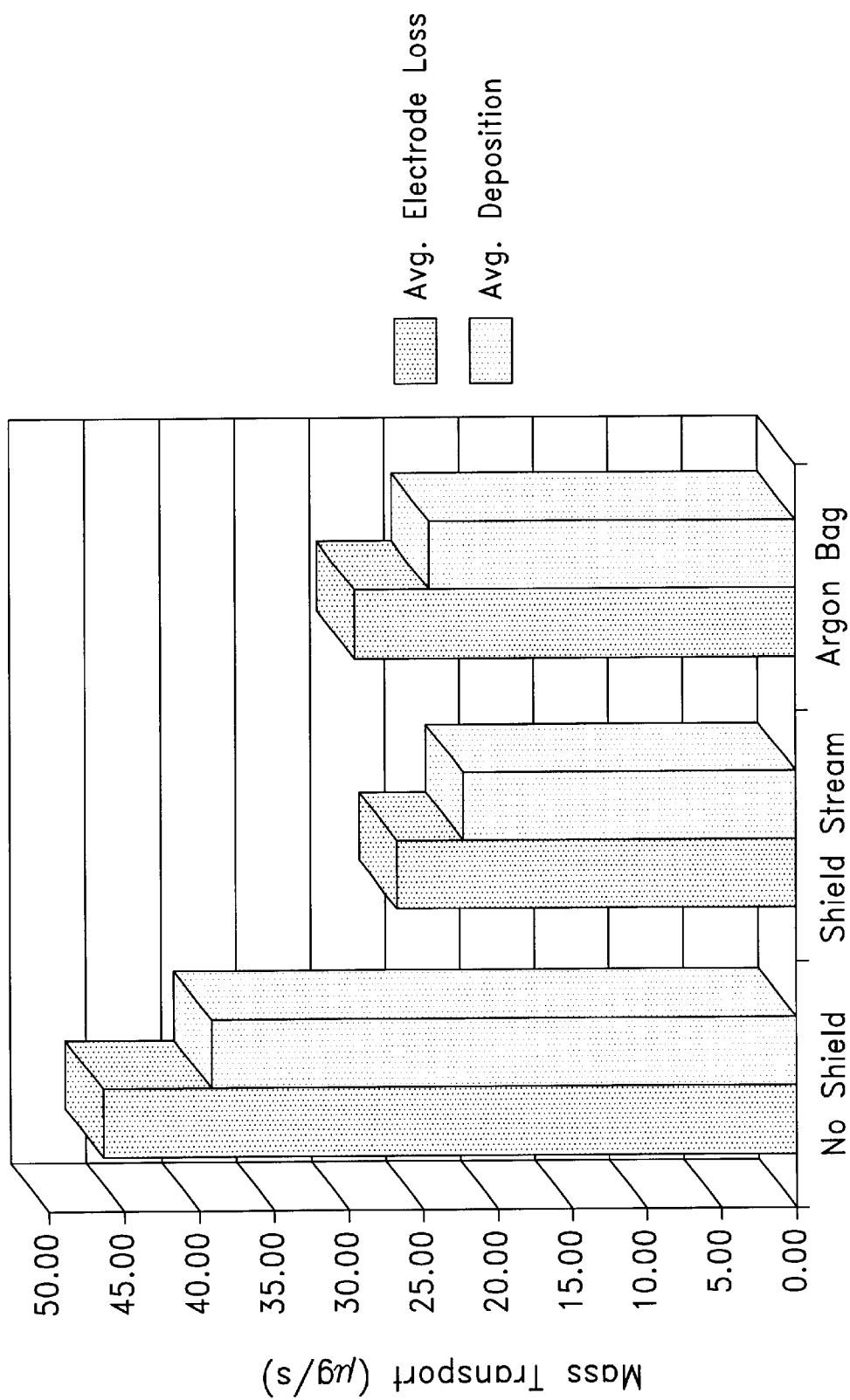
FIG. 12 is a graph showing mass deposition and electrode loss for different types of atmosphere.

The effects on the mass deposition rate and mass deposition efficiency are shown in the graph of FIG. 12. It was found that the mass deposition rate was highest when no shield was present. This may be due to the increased amount of included oxides caused when the shield is absent. Further, it was found that the deposition rate was considerably higher when the argon atmosphere was employed than when the shield stream was used. As shown in FIG. 12, the mass deposition efficiency (mass gained by the substrate divided by the mass lost by the electrode) was highest when the argon atmosphere chamber was used.

Figures 13A, 13B, 13C:
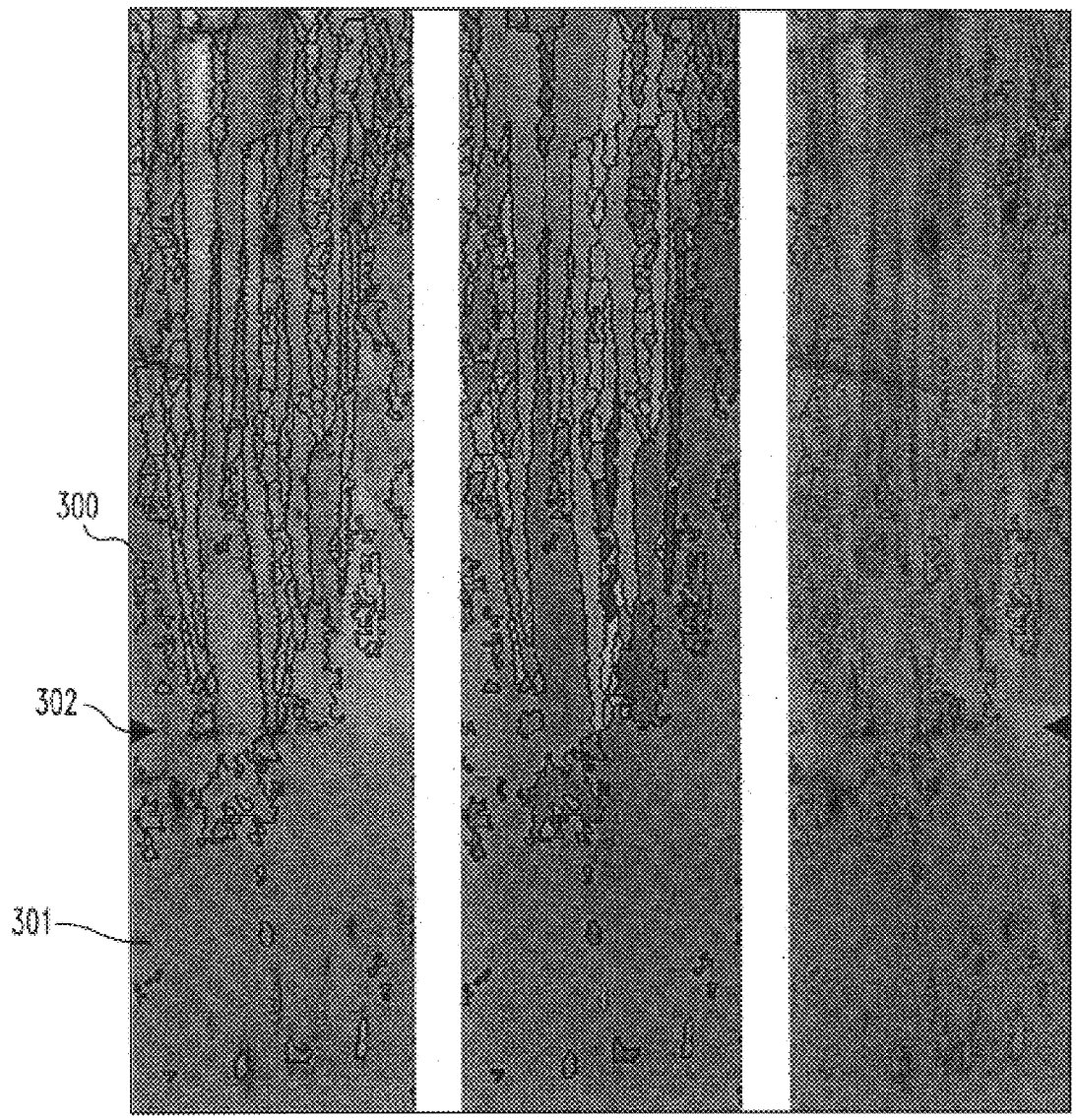
FIGS. 13a–13c are photographs of an electron back scatter action (EBSD) scans of a deposit made by an electrospark alloying process on a single crystal substrate.

The FIGS. 13*a*–13*c* illustrate a weld deposit 300 on a single crystal substrate 301. The electron back scatters defraction scans (EBSD) show that the weld deposit has adopted the orientation of the substrate. The arrow 302 indicates the interface between the weld deposit 300 and the substrate 301. The images indicate that there is no recrystalization at the interface and that the weld deposit has taken on a directional dendritic structure. The electrospark alloying process of the present invention allows for the welding of high Gamma prime type superalloy base materials without having to preheat the base material. High Gamma prime type superalloy materials are believed known to one of ordinary skill in the art and include, but are not limited to IN-718, IN-738, Mar-M-246, René 142, Waspaloy, and CMSX-3. Further, in one embodiment of the present invention, the high Gamma prime type base material/work piece is cooled during the welding process. Preferably, the base material/work piece is maintained within a temperature range of about 30 degrees Fahrenheit to about 80 degrees Fahrenheit. The cooling of the base material/work piece is not limited to applications where the material is a high Gamma prime type material and can be utilized with other materials.

The electrospark alloying process according to the present invention was performed on different types of materials. Images of three weld deposits prepared according to the ESA process of the present invention are shown in FIGS. 14–16. Different base materials and electrodes were used for each sample.

Figure 14A:
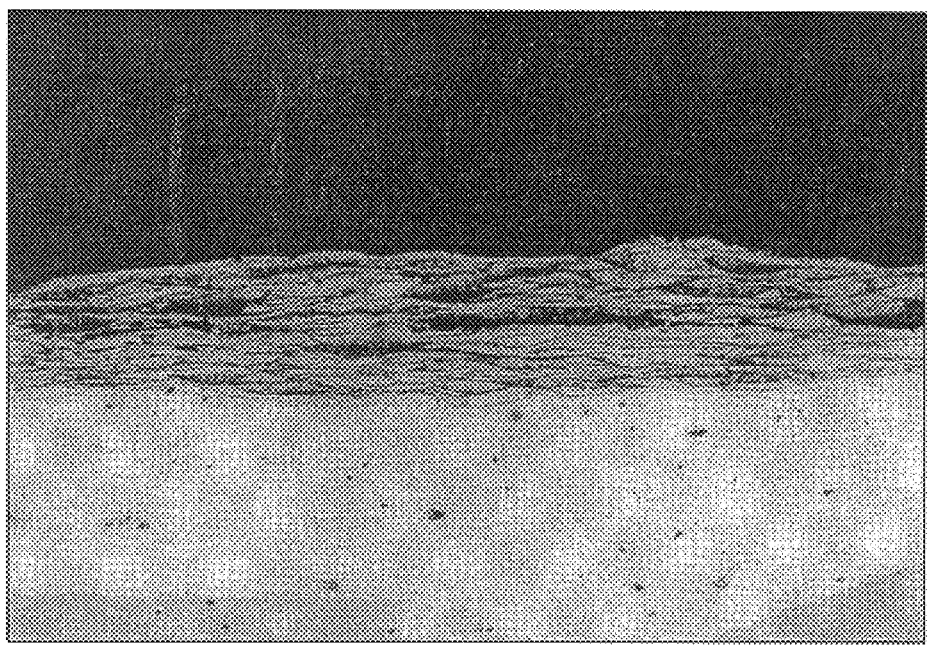
FIGS. 14a–b is a view of a first sample having a material deposited from a superalloy electrode of a material IN-718.
Figure 14B:

Table 1 (below) shows the ESA Parameters and materials for the ESA surface shown in FIGS. 14-*a*–*b*. FIG. 14*a* shows a cross-sectional view and FIG. 14*b* shows a top view of the ESA surface (magnification: 70×).

TABLE 1

| ESA PARAMETERS | |
| --- | --- |
| Sample | II-1 |
| Electrode | IN-718 |
| Base Material | IN-718 |
| Pulse Rate | 500 Hz |
| Capacitance | 40 μF |
| Argon Flow | 30 cfh |
| Current | 4.0 A |
| Potential | 120 V |
| Rotation Set | 90 |
| MATERIALS | |
| Alloy | IN718 |
| Material Spec | AMS 5596 |
| C | 0.08 |
| Mn | 0.35 |
| Si | 0.35 |

TABLE 1-continued

| | |
| --- | --- |
| P | 0.015 |
| S | 0.015 |
| Cr | 21.0 |
| Ni | 55.0 |
| Mo | 3.3 |
| Nb | 5.5 |
| Ti | 1.15 |
| Al | 0.8 |
| Co | 1.0 |
| Ta | 0.05 |
| B | 0.006 |
| Cu | 0.3 |
| Fe | remainder |

Figure 15A:
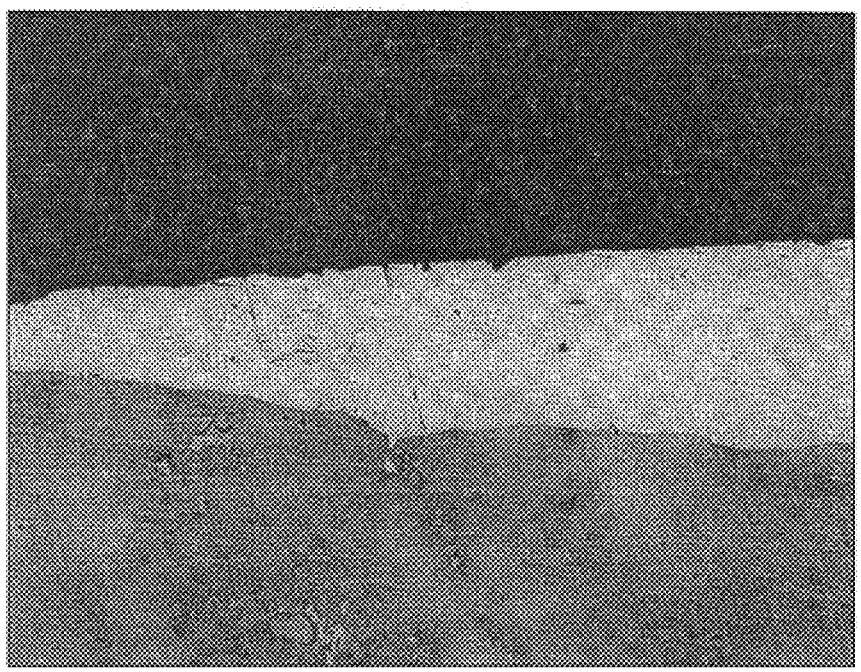
FIGS. 15a–b is a view of a second sample having a material deposited from a superalloy electrode of a material IN-738.
Figure 15B:

Table 2 (below) shows the ESA Parameters and materials for the ESA surface shown in FIGS. 15-*a*–*b*. FIG. 15*a* shows a cross-sectional view and FIG. 15*b* shows a top view of the ESA surface (magnification: 70×).

TABLE 2

| ESA PARAMETERS | |
| --- | --- |
| Sample | NN-1 |
| Electrode | IN-738 |
| Base Material | IN-738 |
| Pulse Rate | 500 Hz |
| Capacitance | 40 μF |
| Argon Flow | 30 cfh |
| Current | 4.0 A |
| Potential | 120 V |
| Rotation Set | 90 |
| MATERIALS | |
| Alloy | IN 738 |
| Material Spec | EMS 73657 |
| C | 0.2 |
| MN | 0.2 |
| Si | 0.3 |
| S | 0.015 |
| Cr | 16.3 |
| Ni | remainder |
| Mo | 2 |
| Nb | 1.1 |
| Ti | 3.7 |
| Al | 3.7 |
| Co | 9 |
| Ta | 2 |
| B | 0.015 |

Figure 16A:
FIGS. 16a–b is a view of a third sample having a material deposited from a superalloy electrode of a material Mar-M-247.
Figure 16B:
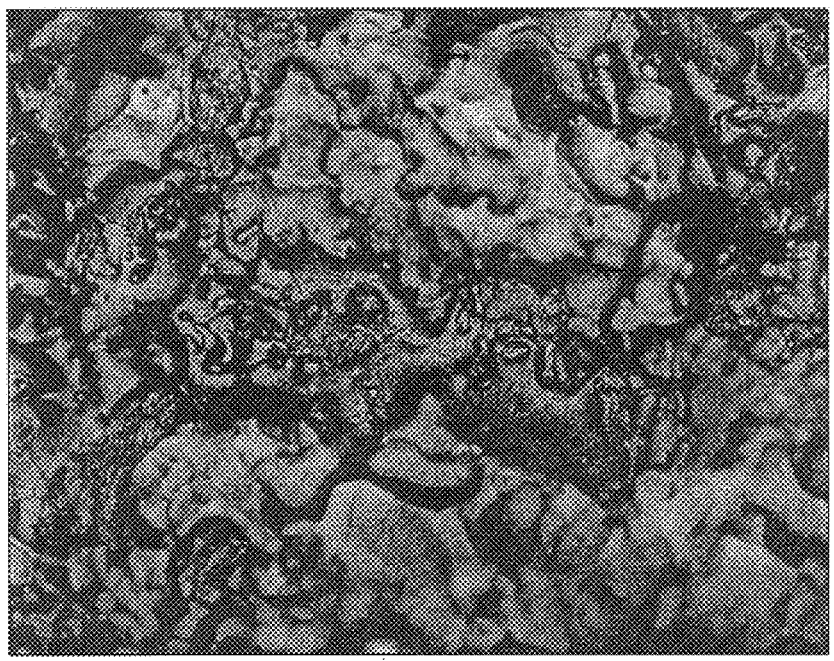

Table 3 (below) shows the ESA Parameters and materials for the ESA surface shown in FIGS. 16-*a*–*b*. FIG. 16*a* shows a cross-sectional view and FIG. 16*b* shows a top view of the ESA surface (magnification: 70×).

TABLE 3

| ESA PARAMETERS | |
| --- | --- |
| Sample | 77-1 |
| Electrode | Mar-M-247 |
| Base Material | Mar-M-247 |
| Pulse Rate | 500 Hz |
| Capacitance | 40 μF |
| Argon Flow | 30 cfh |
| Current | 4.0 A |
| Potential | 120 V |
| Rotation Set | 90 |
| MATERIALS | |
| Alloy | Mar-M-247 |
| Material Spec | EMS 73680 |
| C | 0.17 |
| MN | 0.2 |

TABLE 3-continued

| | |
|---|---|
| Si | 0.2 |
| P | 0.015 |
| S | 0.015 |
| Cr | 8.8 |
| Ni | remainder |
| Mo | 0.8 |
| Ti | 1.2 |
| Al | 5.7 |
| Co | 11 |
| Ta | 3.3 |
| B | 0.02 |
| Cu | 0.1 |
| Fe | 0.5 |
| W | 10.5 |
| Hf | 1.6 |

Figure 17:
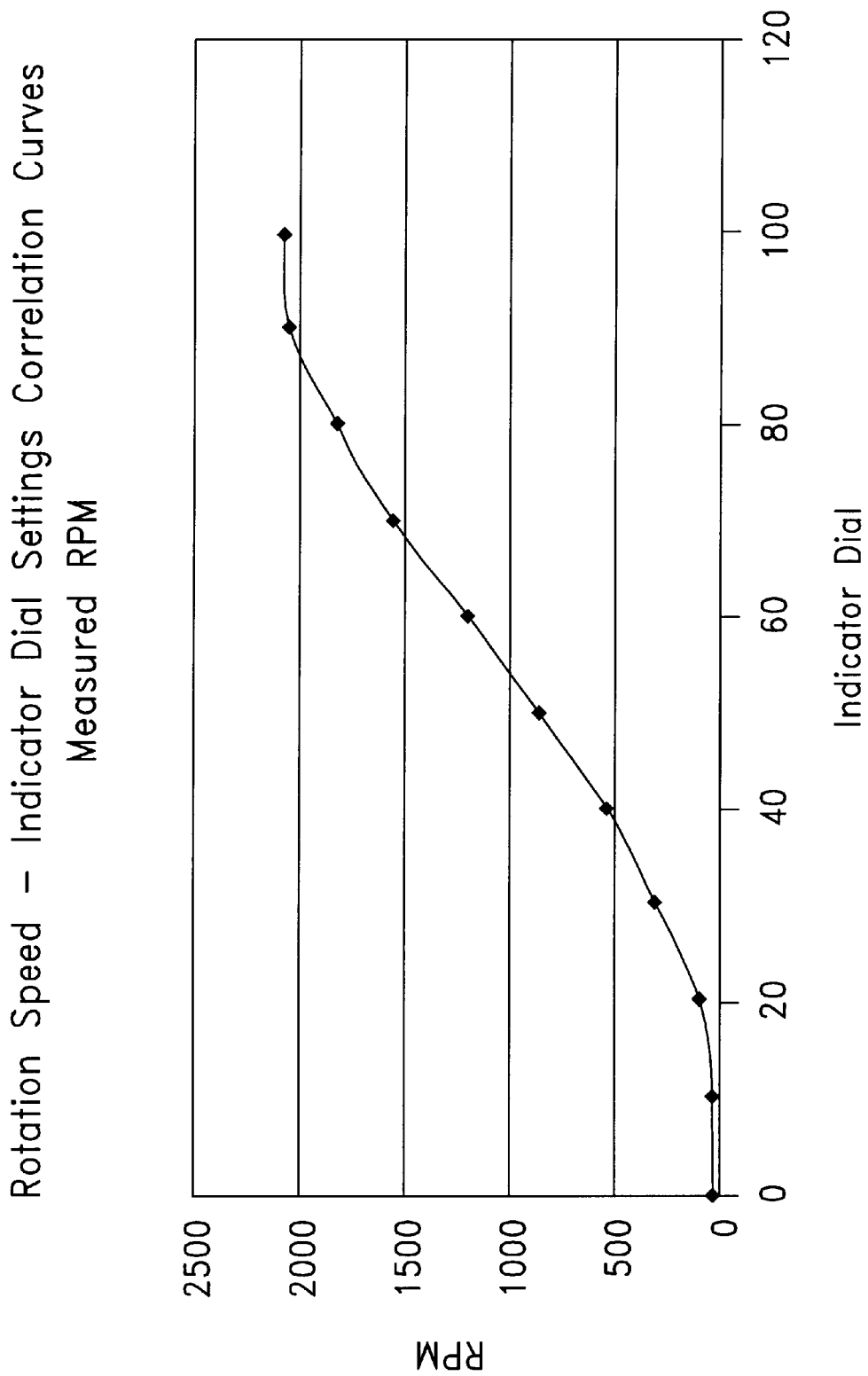
FIG. 17 is a graph showing a correlation between indicator dial settings and RPM.

The effect of the speed at which the electrode rotates was also investigated to determine its effect on deposition. The rotation speed was controlled by a potentiometer that was scaled from 0 to 100. A correlation curve between the scale on the potentionmeter (dial indicator) and the measured RPM is shown in FIG. 17. The correlation between the values are also shown in table 4 (below).

TABLE 4

| Indicator Dial | Measured RPM |
|---|---|
| 0 | 31 |
| 10 | 32 |
| 20 | 94 |
| 30 | 300 |
| 40 | 525 |
| 50 | 850 |
| 60 | 1200 |
| 70 | 1550 |
| 80 | 1820 |
| 90 | 2050 |
| 100 | 2075 |

Figure 18:
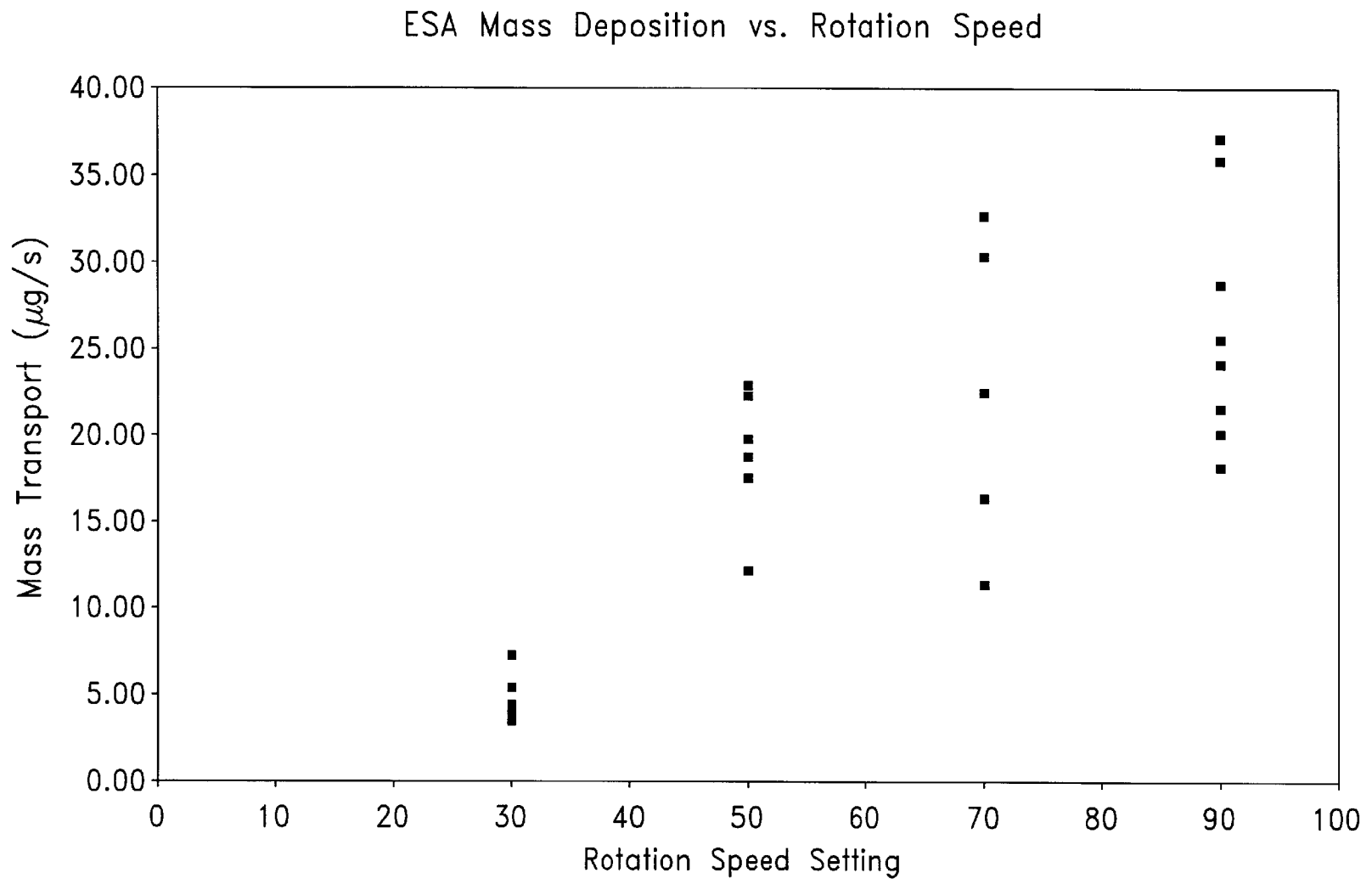
Figure 19:
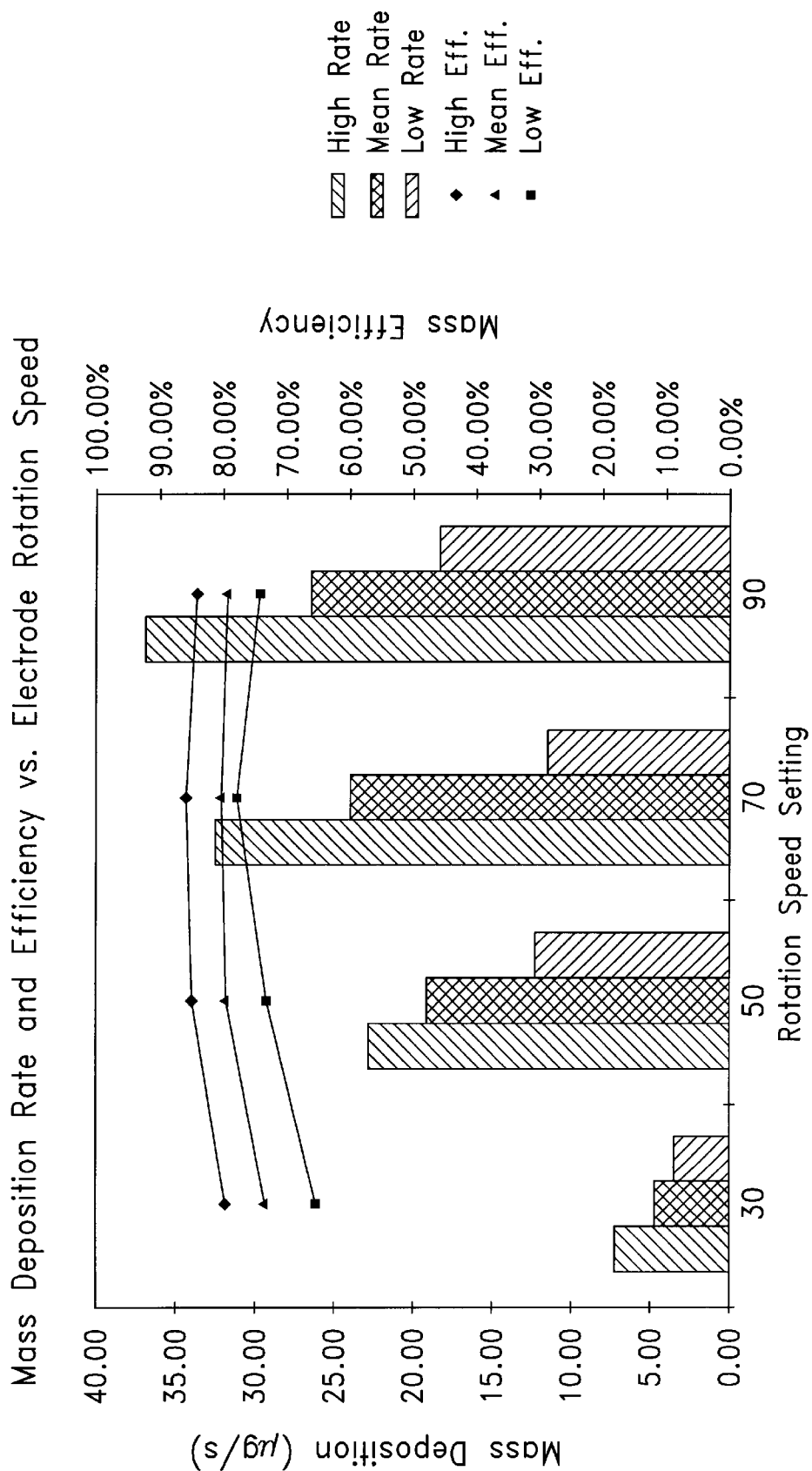
FIG. 19 is a graph of mass deposition rate and efficiency compared with electrode rotation speed.

It was determined that rotation speed settings below 30 were not useful for ESA because the electrode moved too slowly to allow any spark production. A general trend between rotation speed and deposition rate increase was observed, as shown in FIG. 18. It was found that mass deposition efficiency peaked slightly when the rotation speed was set to 70. FIG. 19 shows high, low and mean deposition rates and efficiencies at different rotation speeds. It was found that there were no discernible effects of the speed of rotation on the The electrospark alloying system of the present invention is capable of forming thin weld deposits having a thickness within a range of about 0.0005 inches to less than about 0.005 inches. The thin weld deposits can be made on structures having a microstructure that is one of equiaxed, directionally solidified or single crystal. Further, the weld deposits are applied by a very low heat input process and have been found to not materially affect the microstructure of the base material. The material applied by the electrospark alloying process can have the same or different properties than the underlying base material. The weld deposits can be utilized to repair, refurbish and/or restore components. More specifically activities such as, but not limited to the repair of defects/damage, fill holes, join components, depositing a cladding on the substrate, and/or depositing a coating on the substrate. In one embodiment the process is utilized to repair a gas turbine engine blade tip.

In one embodiment of the present invention the electrospark alloying system is utilized to form thickened weld deposits on the substrate/work piece. The thickened deposits are within a range of about 0.005 inches to about 0.500 inches, and more preferably are within a range of about 0.005 inches to about 0.040 inches. The process is a multipass process that builds the thickened weld deposit in layers. In one embodiment the individual layers are within a range of about 0.001 inches to about 0.007 inches and more preferably are about 0.005 inches. The resulting thickened weld deposit exhibits a layered built structure and is substantially homogenous. However, after a post welding heat treatment operation the structure shows a directional dendritic growth with substantially no evidence of a layered structure.

The weld deposit as it is being formed may have portions that are substantially higher than the surrounding areas in the layer. The portions can be thought of as high spots that will is be leveled with the rest of the layer to yield a more even deposit. In one embodiment of the electrospark alloying process there is utilized a smoothing pass of the electrode to substantially levels the high spots. The smoothing pass operation includes changing the settings on the power supply to decrease the voltage charging the capacitors or change the capacitance of the system. The smoothing passes of the electrode is performed by moving the electrode in a random continuous motion over the underlying surface. The smoothing pass operation is preferably utilized for high spots less than about 0.005 inches. In the case of high spots greater than 0.005 inches the surface can be mechanically worked by operations such as peening, grinding, and/or filing. After, the surface has been smoothed and or flattened the welding process can be continued.

In another form of the present invention the weld deposit is subjected to mechanical work so as to impart compressive stresses to the material. The weld deposit after having compressive stresses imparted to it can have additional layers deposited thereon. The compressive stresses are generally surface level stresses and these magnitudes will depend upon the amount of energy utilized to impact them.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protective.

What is claimed is:

1. A welding apparatus, comprising:
   a main body member;
   a collet coupled to said main body member and adapted for receiving and holding a consumable electrode;
   a drive coupled to said collet for rotating said collet relative to said main body member; and
   a heat sink adjacent said collet for cooling the electrode received in said collet during an electrospark alloying process.

2. The apparatus of claim 1, wherein said collet has an inner surface portion that is adapted to be in contact with at least a portion of an outer surface of the electrode.

3. The apparatus of claim 2, wherein said inner surface portion has a contacting length along the electrode of 0.5 inches to 2.0 inches.

4. The apparatus of claim 1, further comprising:
   a power source; and
   a power cable connecting said power source to said collet, and wherein said collet allows the transfer of power from said power source to the electrode.

5. The apparatus of claim 1, wherein said collet holds the electrode during rotation so that a centerline of the electrode is maintained concentric to within 0.005 inches.

6. The apparatus of claim 1, further comprising:

the electrode, wherein the electrode has a conical tip.

7. The apparatus of claim 1, further comprising:

a chamber having an inert atmosphere provided around said body member, said collet, and said heat sink.

8. The apparatus of claim 1, further comprising:

a mechanized system coupled to said body member for moving said body member.

9. The apparatus of claim 1, further comprising:

a discharge opening provided in said body member to facilitate lamellar flow of inert gas along and around said electrode.

10. The welding apparatus of claim 1, wherein said heat sink abutting an outer surface of said collet.

11. The method of claim 10, wherein said rotating the electrode holder is at a speed within a range from about 500 RPM to about 1500 RPM.

12. An electrospark alloying apparatus, comprising:

a supply of inert gas;

a main body member;

a chuck coupled to said main body member and adapted for receiving and holding a consumable electrode, a portion of the electrode extending from said main body member;

a drive coupled to said chuck for rotating said chuck; and a discharge opening in said main body member, said discharge opening is in fluid communication with said supply of inert gas, wherein said discharge opening facilitates a lamellar gas flow along and around an outer surface of the portion of the electrode for shielding the portion of the electrode.

13. The apparatus of claim 12, further comprising:

the electrode, wherein the electrode has a conical tip.

14. The apparatus of claim 12, which further includes a heat sink disposed in a heat transfer relationship with said chuck and adapted for cooling the consumable electrode within the chuck.

15. A method, comprising:

providing an electrode holder;

electrospark alloying a workpiece with a consumable electrode provided in the electrode holder; and cooling the electrode during said electrospark alloying.

16. The method of claim 15, further comprising:

cooling the workpiece during said electrospark alloying.

17. The method of claim 16, wherein said cooling the workpiece includes maintaining a temperature of the workpiece within a range from about 30 degrees Fahrenheit to about 80 degrees Fahrenheit.

18. The method of claim 15, further comprising:

providing the workpiece, wherein the workpiece includes a high Gamma prime type superalloy.

19. The method of claim 15, wherein said electrospark alloying is a multi-pass process that forms a weld deposit in layers, each of the layers has a thickness within a range from about 0.001 inches to about 0.007 inches.

20. The method of claim 15, further comprising:

smoothing a weld deposit formed during said electrospark alloying by moving the electrode in a continuous motion over the workpiece.

21. The method of claim 15, further comprising:

providing an inert gas in contact with the electrode.

22. The method of claim 21, wherein said providing the inert gas includes flowing the inert gas around the electrode at a rate within a range from about 15 cubic feet per hour to about 30 cubic feet per hour.

23. The method of claim 15, further comprising:

imparting a mechanical stress on a weld deposit formed from said electrospark alloying.

24. The method of claim 15, further comprising:

heat treating the workpiece after said electrospark alloying.

25. The method of claim 15, further comprising:

maintaining a work angle between the electrode and the workpiece within a range from about 45 degrees to about 60 degrees.

26. The method of claim 15, wherein said electrospark alloying includes generating short duration electrical pulses to melt and deposit a portion of the consumable electrode onto the workpiece.

\* \* \* \* \*

Disclaimer

6,417,477—Lawrence E. Brown, Indianapolis; Stephen N. Hammond, Brownsburg; Mark C. Nordin, Indianapolis, all of IN. METHOD AND APPARATUS FOR ELECTROSPARK ALLOYING. Patent dated July 9, 2002. Disclaimer filed April 16, 2003, by the assignee, Rolls-Royce Corporation.

Hereby enters this disclaimer to claims 1-26 of said patent.

*(Official Gazette, July 15, 2003)*